United States Patent
Tian

(10) Patent No.: US 7,747,075 B2
(45) Date of Patent: Jun. 29, 2010

(54) SALIENT MOTION DETECTION SYSTEM, METHOD AND PROGRAM PRODUCT THEREFOR

(75) Inventor: Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1409 days.

(21) Appl. No.: 11/156,508

(22) Filed: Jun. 20, 2005

(65) Prior Publication Data

US 2006/0285724 A1 Dec. 21, 2006

(51) Int. Cl.
*G06K 9/34* (2006.01)
*H04N 7/12* (2006.01)
*H04N 7/18* (2006.01)

(52) U.S. Cl. .................. 382/173; 382/103; 382/190; 375/240.01; 375/347; 348/155

(58) Field of Classification Search .............. 382/100, 382/103, 106–107, 171–173, 180, 190, 195; 375/240.01–240.29, 347–350; 348/135–159
See application file for complete search history.

(56) References Cited

U.S. PATENT DOCUMENTS

| | | | | |
|---|---|---|---|---|
| 5,109,425 | A * | 4/1992 | Lawton | 382/107 |
| 5,649,032 | A * | 7/1997 | Burt et al. | 382/284 |
| 5,684,887 | A * | 11/1997 | Lee et al. | 382/107 |
| 5,706,416 | A * | 1/1998 | Mann et al. | 345/427 |
| 5,748,761 | A * | 5/1998 | Chang et al. | 382/107 |
| 5,999,662 | A * | 12/1999 | Burt et al. | 382/284 |
| 6,157,677 | A * | 12/2000 | Martens et al. | 375/240.16 |
| 6,188,776 | B1 * | 2/2001 | Covell et al. | 382/100 |
| 6,303,920 | B1 * | 10/2001 | Wixson | 250/208.1 |
| 6,492,986 | B1 * | 12/2002 | Metaxas et al. | 345/420 |
| 6,499,025 | B1 * | 12/2002 | Horvitz et al. | 706/52 |
| 6,766,037 | B1 * | 7/2004 | Le et al. | 382/107 |

OTHER PUBLICATIONS

Monnet et al., Background Modeling and Subtraction of Dynamic Scenes, In Proc. of International Conference on Computer Vision (ICCV), 2003, pp. 1305-1312.
Stauffer et al., Adaptive Background mixture Models for Real-time Tracking, CVPR99, Jun. 1, 1999.
Tian et al., Robust Motion Detection with Complex Background for Real-time Video Surveillance, Aug. 2004.
Toyama et al., Wallflower: Principles and Practice of Backgroung Maintenance, In Proc. International Conference on Computer Vision, 1999, pp. 255-261.
Wildes, A Measure of Motion Salience for Surveillance Application, in Proc. of IEEE International Conference on Image Processing, 1998, pp. 183-187.
Wixson, Detecting Salient Motion by Accumulating Directionally Flow, IEEE Patern Analysis and Machine Intelligence, Aug. 1, 2000, pp. 774-779, vol. 27, No. 8.

* cited by examiner

*Primary Examiner*—Manav Seth
(74) *Attorney, Agent, or Firm*—Law Office of Charles W. Peterson, Jr.; Preston J. Young, Esq.

(57) ABSTRACT

An apparatus and method of identifying objects with salient motion in a scene and program product therefor. A region of change is identified within a scene. Optical flow is determined for the region of change. Pixels moving in a common direction are identified as seed pixels. Seed pixels are expanded to form pixel clusters. Temporal imaging results are fused to identify those objects with salient motion.

17 Claims, 4 Drawing Sheets

SALIENT MOTION DETECTION SYSTEM, METHOD AND PROGRAM PRODUCT THEREFOR

FIELD OF THE INVENTION

The present invention generally relates to video motion detection and more particularly, to detecting salient motion in streaming video of real life situations.

BACKGROUND DESCRIPTION

It is well known that detecting moving objects in streaming video is a significant and difficult research problem. One may categorize motion, e.g., in a video of a typical real life environment, as interesting or salient and uninteresting or distracting. Salient motion is normally defined as motion from a transient object such as a person or a vehicle in the scene. Distracting motion is background oscillatory or random motion, e.g. leaves swaying in the wind. Since typically, salient motion is of interest in a particular scene, distracting motion complicates salient motion detection.

Background subtraction is one conventional approach to effectively detect moving objects in a scene with a stationary background. However, where the scene is dynamic with a non-stationary background, detecting moving objects is more difficult. Adaptive background subtraction has been developed to handle non-stationary background. For example, Ren et al., "Motion Detection with Non-stationary Background," *International Proceedings of the 11th International Conference on Image Analysis and Processing*, 2001, 78-83, teaches a Spatial Distribution of Gaussians (SDG) model to detect and, approximately, extract moving objects using motion compensation. Ren et al. demonstrates the capability of detecting small moving objects with a highly textured background with pan-tilt camera motion. In another example, Stauffer et al., "Adaptive Background mixture Models for Real-time Tracking", CVPR99, June, 1999, teaches modeling each pixel as a mixture of Gaussians and using an on-line approximation to update the model. Stauffer et al. can deal with lighting changes, slow-moving objects and introducing or removing objects from the scene. In yet another example, Monnet et al., "Background Modeling and Subtraction of Dynamic Scenes", *International Proceedings of International Conference on Computer Vision (ICCV)*, 2003, Pages 1305-1312, teaches prediction-based online modeling of dynamic scenes. Monnet et al. has been somewhat effective on coastline scenes with ocean waves and on pastoral scenes with swaying trees. Unfortunately, the approaches all require extensive learning from hundreds of images of the scene background or, frames, without moving objects to learn the background model. Further, it is difficult to detect objects of interest in an area dominated by distracting motion, e.g., in an ocean scene, for example, especially if the distracting motion has the same general direction as the objects, e.g., as the ocean waves.

As shown above, background subtraction has not proven particularly effective and frequently provides false positives. False positives have been especially frequent for an environment that includes objects with distracting motion, e.g., specularities on water, vegetation in the wind and etc. For example, application of background subtraction to a person walking in front of oscillating branches on a windy day detects scene movement for both the person and the moving leaves. See, e.g., Horprasert et al., "A Statistical Approach for Real-Time Robust Background Subtraction and Shadow Detection," *Proceedings of IEEE Frame-Rate Workshop*, Kerkyra, Greece, 1999.

Finding the temporal difference in a video scene has proven to be the simplest approach to extracting moving objects and, also, adapting to a dynamic environment. Unfortunately, temporal differencing does not detect the entire shape of a moving object with uniform intensity. Hybrid change detectors have combined temporal difference imaging and adaptive background estimation to detect regions of change. For example, Huwer et al. "Adaptive Change Detection for Real-time Surveillance applications," *International Proceedings of the 3rd IEEE Workshop on Visual Surveillance*, 2000, pp. 37-45, teaches combining temporal differencing with adaptive background subtraction to handle lighting changes.

These prior art motion detection approaches still cannot handle quick image variations, e.g., a light turning on or off. Prior art adaptive background subtraction methods, in particular, require hundreds images to learn the background model, do not handle stationary objects in the scene that start to move; and cannot handle quick image variations and large distracting motion.

A limited example of salient motion detection is taught by Wildes, "A Measure of Motion Salience for Surveillance Applications," *International Proceedings of IEEE International Conference on Image Processing*, p 183-187, 1998. Wildes teaches using spatiotemporal filtering to measure motion salience. To accommodate the velocity-dependent nature of spatiotemporal filters, Wildes's method has been effective on rapidly moving objects by treating the moving objects as moving with a certain velocity. However, Wildes does not work for slow moving objects. Wixson, "Detecting Salient Motion by Accumulating Directionally Flow," *IEEE Transactions on Pattern Analysis and Machine Intelligence*, Vol. 22. No. 8. pp 774-779, August, 2000 teaches accumulating directionally-consistent flow to detect salient motion. Wixson calculates subpixel optical flow and integrates frame-to-frame optical flow over time for each pixel to compute a rough estimate of the total image distance the pixels have moved. Wixson updates a salient measure on each frame. The Wixson salient measure is directly related to the distance over which a point has traveled with a consistent direction. However, Wixson has proven very time consuming and objects leave salience "trails" in the results.

Thus, there is a need for detecting objects in a video scene moving through the scene with salient motion, even in the presence of large objects with distracting motion and while ignoring objects in the scene moving with distracting motion and especially, without requiring large numbers of images or frames to identify stationary or background objects and, regardless of quick object variations.

SUMMARY OF THE INVENTION

It is a purpose of the invention to detect objects in a video scene moving through the scene with salient motion;

It is another purpose of the invention to ignore motionless objects in a video scene and objects in the scene moving with distracting motion;

It is yet another purpose of the invention to detect objects in a video scene moving through the scene with salient motion and especially, regardless of quick object variations and while ignoring motionless objects in a video scene and objects in the scene moving with distracting motion.

The present invention relates to an apparatus and method for identifying objects with salient motion in a scene and program product therefor. A region of change is identified within a scene. Optical flow is determined for the region of change. Pixels moving in a common direction are identified as seed pixels. Seed pixels are expanded to form pixel clusters. Temporal imaging results are fused to identify those objects with salient motion. The computer program product includes computer program code fixed in a tangible medium for executing salient motion detection steps. The apparatus identifies objects in a video stream with salient motion according to the preferred method.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
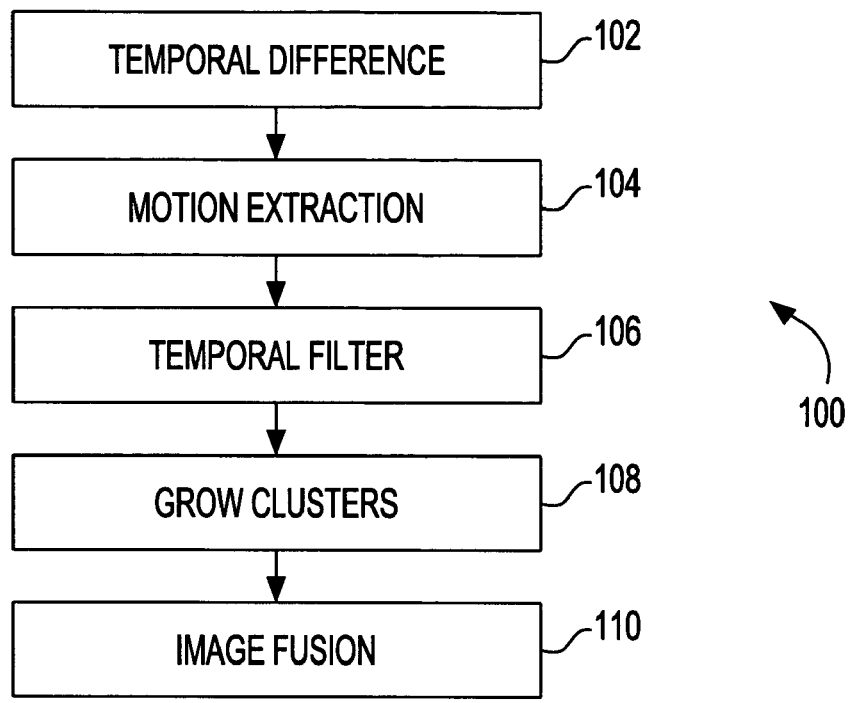
FIG. 1 shows a flow diagram of steps in an example of detecting objects with salient motion according to a preferred embodiment of the present invention.

Turning now to the drawings, and more particularly FIG. 1 shows a flow diagram 100 of steps in an example of detecting objects with salient motion according to a preferred embodiment of the present invention. Generally, moving objects in a scene (e.g., a video scene or streaming video) that have salient motion are those that tend to move in consistent (monotonously in the x and/or y) directions over some period of time, e.g., a passerby on a road through a forest. So, objects with salient motion traverse a video scene or a portion of the scene in a number of discrete images or frames. The video stream may be, for example from a video camera connected to a video adapter on a typical state of the art computer or personal computer (PC), streaming video, e.g., provided over a network such as the Internet or, a multimedia file provided in a typical multimedia format, e.g., in avi, mpeg or wmv format.

Salient motion detection begins in step 102 on a video stream or scene that includes frames or discrete images with the general form of I(x, y, t). A region of change is identified in the frames and a temporal filter developed for the scene. For example, the region of change may be identified by image subtraction, subtracting from each image, subsequent images in the sequence, e.g., t−1, t, t+1, . . . to locate temporal differences in the scene. The temporal filter may be developed simultaneously by detecting pixels with constant movement in one direction, i.e., with either consistent X-component or Y-component movement. Next, in step 104, a frame-to-frame optical flow is calculated for the region of change. In step 106, the temporal filter is applied to the region of change to identify pixels continually moving in the same direction. In step 108, those pixels identified in step 106 are designated as seed pixels for the X-component and Y-component of optical flow. The seed pixels are expanded or grown to form pixel clusters, e.g., an N by N neighborhood or cluster of pixels that move in one direction. Finally, in step 110, image components are fused to detect objects with salient motion. So in this fusing step, all temporal difference imaging results from step 102 are combined with temporal filtered motion from step 106 and region information from step 108 to detect any objects in the scene with salient motion.

So in step 102, for each image, I(x, y, t), subtract the next subsequent image, I(x, y, t+1), Optionally, a threshold $T_d$ may be applied to the resulting difference image, $I_{difference}$(x, y, t), to locate the region of changes. $T_d$ can be derived from image statistics, e.g., the mean, average or standard deviation of object movement within the image. For slow motion or temporally stopped objects, a weighted accumulation, $I_{accum}$(x, y, t), with a fixed weight for the new observation is used to compute the temporal difference image $I_{difference}$(x, y, t). So, for example:

$$I_{difference}(x, y, t+1) = \begin{cases} 1, \text{if } (I_{accum}(x, y, t+1) > T_d) \\ 0, \text{otherwise} \end{cases}$$

and $$I_{accum}(x, y, t+1) = (1 - W_{accum})I_{accum}(x, y, t) + W_{accum}|I(x, y, t+1) - I(x, y, t)|,$$

where $W_{accum}$ is the accumulation parameter which describes the temporal range for accumulation of difference images, and $I_{accum}$(x, y, t−1) is initialized to an empty image. For example, $T_d$=15 and $W_{accum}$=0.5 may be used for all the results.

These image components can be used to define a rectangular change region in the image. So, the change region may be defined as a two dimensional (2D) image with width w and height h, e.g., 320×240 pixels. The size of the change region can be from (0, 0) to (w, h). Optionally, the computation may be reduced by down-sampling the image, e.g., a 4:1 down-sampling to 160×120 pixels. Thus, instead of using the whole image, the optical flow computation and the temporal filter may be applied to this down-sampled region of changes for salient motion detection.

A number of well known methods are available and suitable for extracting a 2D motion field. Preferably, for accuracy and performance considerations, however, the motion field is extracted based on the assumption that intensity values of any given region do not change but merely shift from one position to another. See, e.g., B. D. Lucas and T. Kanade, "An Iterative Image Registration Technique with an Application in Stereo Vision," *The 7th International Joint Conference on Artificial Intelligence*, 1981, 674-679. This provides superior performance at a low computational cost with sparse flow maps and consistently produces accurate depth maps with good noise tolerance. Also, to identify an incorrect flow between two frames, a forwards-backwards checking is performed to examine whether the flow fields map to the same points.

So, taking the displacement of a moving object over an n×n window (R) of an image from time t to t+1 as d; $I_{t+1}$(x+d)−$I_t$(x)=0. The translation d of the window may be found by minimizing a cost function E defined as:

$$E = \sum_{x \in R} [I_{t+1}(x+d) - I_t(x)]^2.$$

The translation d may be minimized by iteratively calculating:

$$d_{n+1} = d_n + \left\{\sum_{x \in R} \left(\frac{\partial I}{\partial x}\right)^T \bigg|_{x+d_n} [I_t(x) - I_{t+1}(x)]\right\} \times \left[\sum_{x \in R} \left(\frac{\partial I}{\partial x}\right)\left(\frac{\partial I}{\partial x}\right)^T \bigg|_{x+d_n}\right]^{-1},$$

where the initial estimate, $d_0$, is taken as zero when only small displacements are involved.

Figure 2:
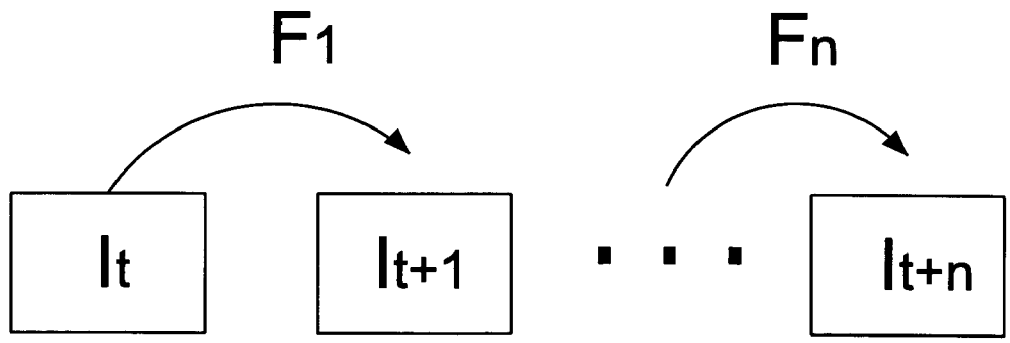
FIG. 2 shows an example of application of the temporal filter to the calculated optical flow of frames in a period time [t, t+n]

FIG. 2 shows an example of application of the temporal filter to the calculated optical flow of frames in a given time period [t, t+n]. The optical flow of frames $I_t$, $I_{t+1}$, ... $I_{t+n}$ in [t, t+n] are represented as $F_1$, $F_2$, ... $F_n$ which have an X-component, $F_{1,x}$, $F_{2,x}$, ... $F_{n,x}$ and a Y-component is $F_{1,y}$, $F_{2,y}$, ... $F_{n,y}$, respectively. An object with salient motion moves in a consistent direction over a given period time, as reflected in either its X-component or the Y-component. So in step 104 of FIG. 1, the optical flow of the region with salient motion in [t, t+n] should be in same direction. Accordingly, the X-component and Y-component of optical flow are treated separately.

A chain of optical flow in the time period [t, t+n] is constructed in step 104 for each pixel in the region with changes detected by temporal differencing. Each pixel (x, y) in frame $I_t$ moves to $(x+dx_1, y+dy_1)$ in frame $I_{t+1}$, where $dx_1$ and $dy_1$ can be obtained from $F_{1,x}$ and $F_{1,y}$. A moving pixel has movement in the x direction if its X-component $dx_1 > 0$; otherwise, the pixel is moving in negative direction. In the $n^{th}$ frame $I_{t+n}$ of the chain, the pixel position is $(x+dx_1+dx_2+ \ldots +dx_n, y+dy_1+dy_2+ \ldots +dy_n)$. Objects with salient motion may be identified by counting the number of pixels that have an X-component with positive optical flow ($P_{i,X}$) and the number of pixels that have an X-component with negative optical flow ($N_{i,X}$) in [t, t+n] using $F_{1,x}$, $F_{2,x}$, ... $F_{n,x}$, where $i \in [1, n]$. So, initially, $P_{iX}=0$, and $N_{iX}=0$ if i=1 and, thereafter, $$P_{iX} = \begin{cases} P_{(i-1)X} + 1, & \text{if } (F_{i,X} > 0) \\ P_{(i-1)X}, & \text{otherwise} \end{cases}$$

and $$N_{iX} = \begin{cases} N_{(i-1)X} + 1, & \text{if } (F_{i,X} < 0) \\ N_{(i-1)X}, & \text{otherwise} \end{cases}$$

A pixel belongs to an object with salient motion, if $P_{nX} \geq T_1$ or $N_{nX} \geq T_1$. Similarly, a moving pixel has movement in the y direction if it Y-component $dy_1 > 0$ and movement in the y direction is treated identically as in the x direction for determining $P_{iY}$ and $N_{iY}$.

Figure 3A:
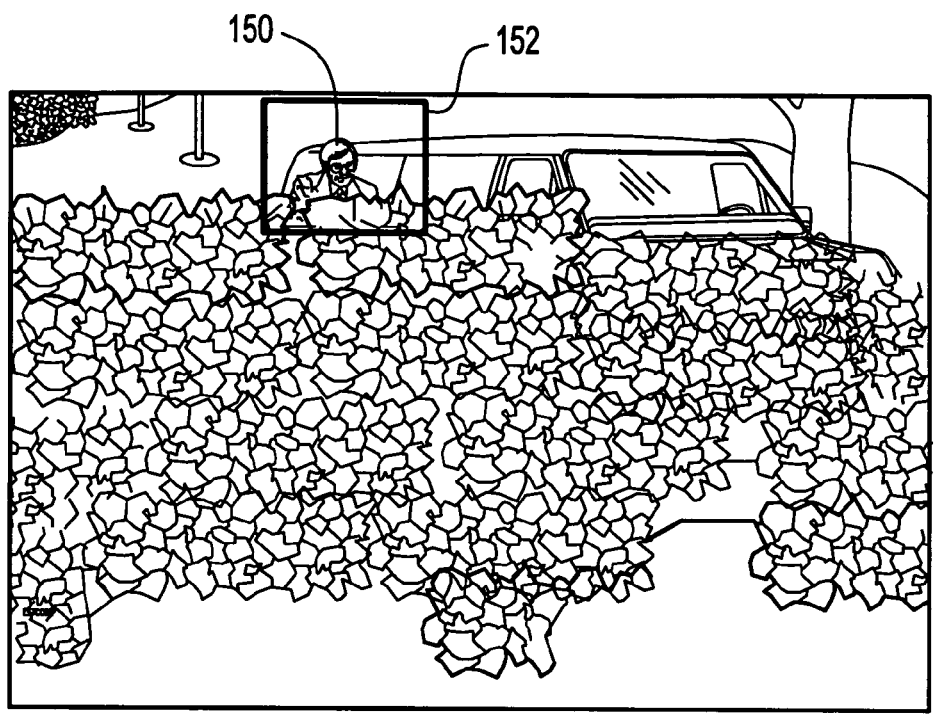
FIGS. 3A-G show an example identification of an object with salient motion in a scene with distraction motion (swaying trees), in this example, with n=10, $T_1$=n-n/3 and the same parameter settings used for both the X-components and the Y-components.
Figure 3B:
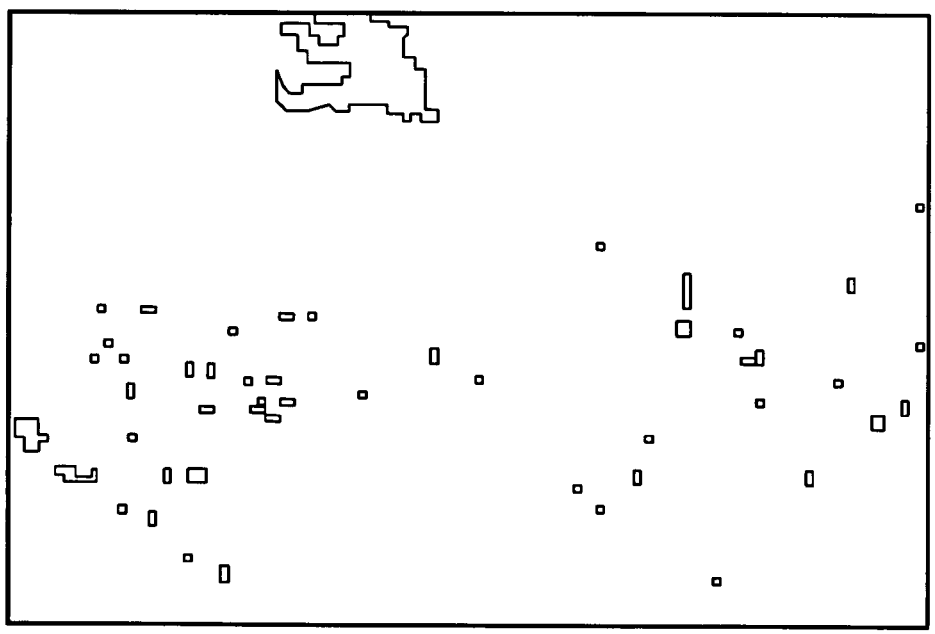
Figure 3C:
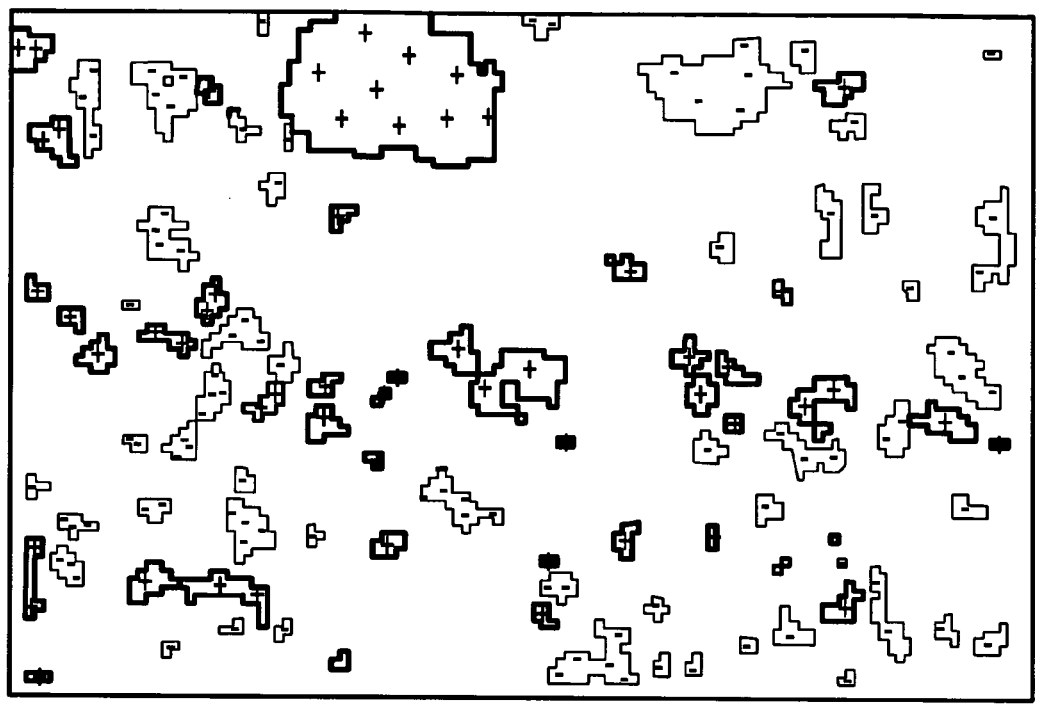
Figure 3D:
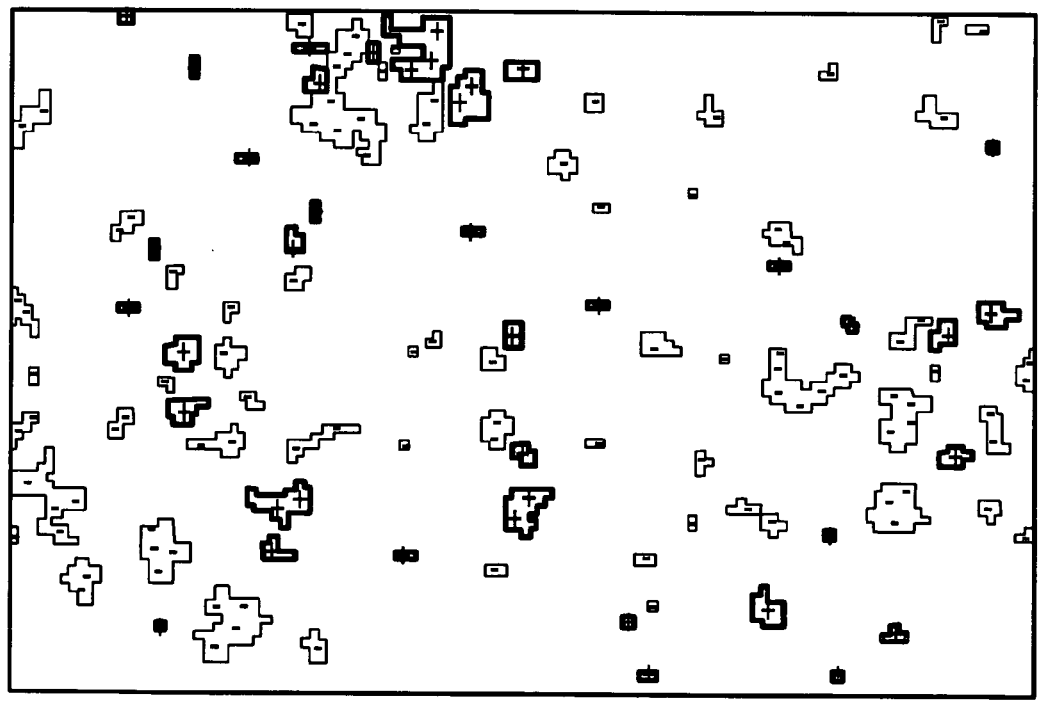
Figure 3E:
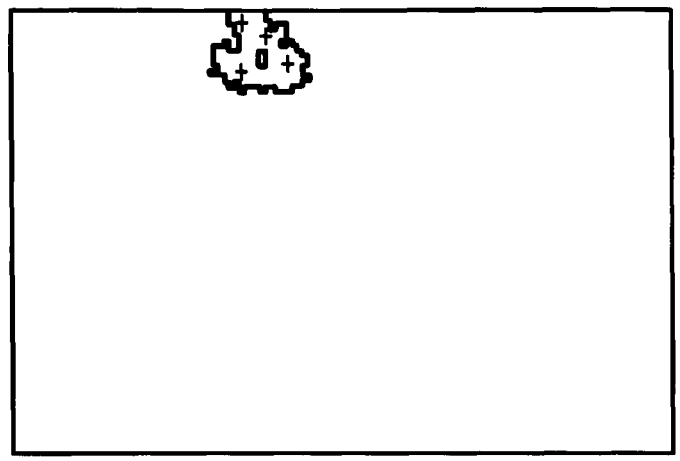
Figure 3F:
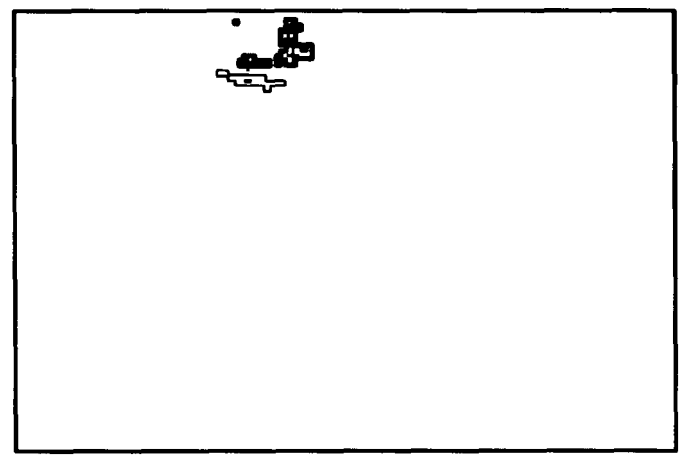
Figure 3G:
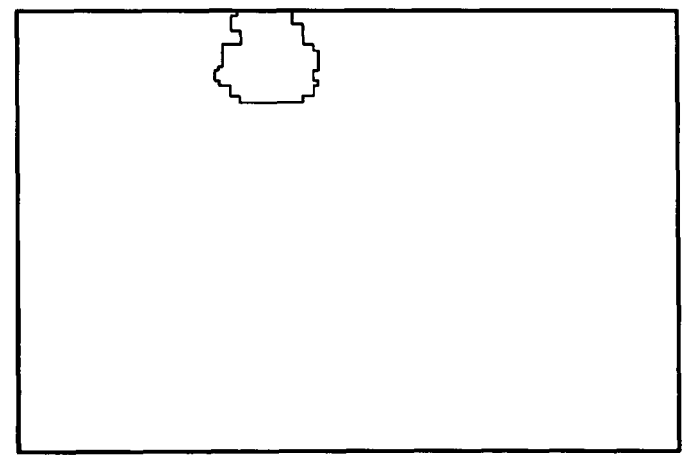

FIGS. 3A-G show an example of identifying an object (person 150) with salient motion in a scene with distraction motion (swaying trees), in this example, with n=10, $T_1=n-n/3$ and the same parameter settings used for both the X-components and the Y-components. FIG. 3A shows one image or frame in a streaming video of a scene, i.e., with a sequence of such frames or images. A rectangle 152 designates the person 150 walking behind wildly swaying leaves. FIG. 3B shows the accumulated difference image for the scene from step 102 of FIG. 1. FIG. 3C shows the X-component of optical flow and FIG. 3D shows the Y-component from step 104 with positive movement indicated by plus sign (+) fill and negative movement indicated by a minus sign (−) fill. FIG. 3E shows the X-component of flow after application of the temporal filter and FIG. 3F shows the Y-component of flow after application of temporal filter from step 106. Because the person 150 is walking from right to left, the X-component of temporal filtered flow dominates the salient motion detection in this sequence. FIG. 3G shows the object finally detected as having salient motion, $I_{salient}(x, y, t)$, from step 110.

From FIGS. 3C and D, it is apparent that the temporal motion filter applied in step 104 has filtered out all of the distracting motion. Also, after applying the temporal motion filter in step 104, the region of movement is smaller than that in the original flow. To avoid splitting one object into several objects, the pixels detected by the temporal motion filter are used as seed pixels in step 108 for the X-component and Y-component of original optical flow. Then, the seed pixels are grown to form a pixel cluster of the N×N neighborhood (e.g., a 3×3 neighborhood) moving in the same direction. So, the salient motion image ($I_{salient}(x, y, t)$) of FIG. 3G is generated in step 110 by combining the image of temporal difference ($I_{difference}(x, y, t)$), the temporal filtered images ($I_{X-temporal}(x, y, t)$ and $I_{Y-temporal}(x, y, t)$) and the region motion information $I_{RegionMotion}(x, y, t)$. Thus, the output salient motion image has the form:

$$I_{salient}(x, y, t) = I_{differnce}(x, y, t) \cap [I_{X-temporal}(x, y, t) \cup I_{Y-temporal}(x, y, t) \cup I_{RegionMotion}(x, y, t)].$$

Advantageously, salient motion detection according to the present invention does not require prior background image learning to detect objects with salient motion even in complex backgrounds with distracting motion, e.g., for real-time surveillance applications. Temporal differencing is applied to temporally filtered optical flow for robust salient motion object detection in real-time. Further such detection may be effected on objects with a uniform direction of travel without requiring prior knowledge about object size and shape. Previously stationary objects (e.g., a parked car) in the scene that begin to move are easily detected. Such robust salient motion detection may be demonstrated for a variety of real environments that include distracting motions, e.g., lighting changes, swaying branches, rippling water, waterfalls, fountains and etc.

While the invention has been described in terms of preferred embodiments, those skilled in the art will recognize that the invention can be practiced with modification within the spirit and scope of the appended claims. It is intended that all such variations and modifications fall within the scope of the appended claims.

What is claimed is:

1. A method of identifying objects with salient motion in a scene, said method comprising of the steps of:
   a) identifying a region of change within a scene, wherein identifying said region of change develops a temporal filter;
   b) determining optical flow for said region;
   c) identifying seed pixels moving in a common direction in said region;
   d) expanding identified said seed pixels, pixel clusters being formed from expanded said seed pixels; and
   e) fusing results of steps (a), (b) and (c), fused said results identifying objects having salient motion.

2. A method as in claim 1, wherein said scene is a video stream including a plurality of frames, I(x, y, t).

3. A method as in claim 2, wherein the step (a) of identifying said region of change comprises subtracting a subsequent image.

4. A method as in claim 2, wherein the step (a) of identifying said region of change for each image comprises finding a difference image $I_{difference}(x, y, t)$ using a weighted accumulation, $I_{accum}(x, y, t)$, with a fixed weight for each new observation.

5. A method as in claim 2, wherein said temporal filter is determined by calculating optical flow for said plurality of frames over a given period of time, [t, t+n].

6. A method as in claim 5, wherein calculating said optical flow comprises identifying each of a plurality of pixels having a monotonously changing position.

7. A method as in claim 6, wherein said plurality of said identified pixels in [t, t+n] comprise positive X-component pixels with positive X-component optical flow ($P_{i,X}$), negative X-component with negative optical flow ($N_{i,X}$), positive Y-component pixels with positive Y-component optical flow ($P_{i,Y}$) and negative Y-component with negative optical flow ($N_{i,Y}$).

8. A method as in claim 2, wherein the step (d) of fusing results comprises combining an image of temporal difference ($I_{difference}(x, y, t)$) from step (a), temporal filtered images ($I_{X-temporal}(x, y, t)$ and $I_{Y-temporal}(x, y, t)$) from step (b) and a region motion information ($I_{RegionMotion}(x, y, t)$) from step (c), a salient motion image ($I_{salient}(x, y, t)$) resulting from said combination having the form:

$$I_{salient}(x, y, t) = I_{difference}(x, y, t) I [I_{X-temporal}(x, y, t) Y I_{Y-temporal}(x, y, t) Y I_{RegionMotion}(x, y, t)].$$

9. A computer program product for identifying objects with salient motion in a scene, said computer program product comprising a computer usable medium having computer readable program code thereon, said computer readable program code comprising:

computer readable program code means for identifying a region of change within a plurality of sequential frames, I(x, y, t), wherein identifying said region of change develops a temporal filter;

computer readable program code means for determining optical flow for said region of change;

computer readable program code means for identifying seed pixels in said region moving in a common direction;

computer readable program code means for expanding identified said seed pixels, pixel clusters being formed from expanded said seed pixels; and computer readable program code means for fusing temporal imaging results.

10. A computer program product as in claim 9, wherein the computer readable program code means for identifying said region of change for each image comprises computer readable program code means for subtracting a subsequent image.

11. A computer program product as in claim 9, wherein the computer readable program code means for identifying said region of change for each image comprises computer readable program code means for finding a difference image $I_{difference}(x, y, t)$ using a weighted accumulation, $I_{accum}(x, y, t)$, with a fixed weight for each new observation.

12. A computer program product as in claim 10, wherein computer readable program code means for developing said temporal filter comprises computer readable program code means for calculating optical flow for said plurality of frames over a given period of time, [t, t+n].

13. A computer program product as in claim 12, wherein computer readable program code means for calculating said optical flow comprises computer readable program code means for identifying each of a plurality of pixels having a monotonously changing position.

14. A computer program product as in claim 13, wherein said plurality of said identified pixels in [t, t+n] comprise positive X-component pixels with positive X-component optical flow ($P_{i,X}$), negative X-component with negative optical flow ($N_{i,X}$), positive Y-component pixels with positive Y-component optical flow ($P_{i,Y}$) and negative Y-component with negative optical flow ($N_{i,Y}$).

15. A computer program product as in claim 14, wherein said computer readable program code means for identifying each of a plurality of pixels identifies pixels as belonging to an object with salient motion for a selected threshold $T_1$ and comprises computer readable program code means for:

representing optical flow of frames $I_t, I_{t+1}, \ldots I_{t+n}$ in [t, t+n] as $F_1, F_2, \ldots F_n$ having an X-component, $F_{1,x}, F_{2,x}, \ldots F_{n,x}$ and a Y-component is $F_{1,y}, F_{2,y}, \ldots F_{n,y}$, respectively, for $i \subset [1,n]$; and, initially, $P_{i,X}=0$, and $N_{i,X}=0$; and otherwise $$P_{iX} = \begin{cases} P_{(i-1)X} + 1, & \text{if } (F_{i,X} > 0) \\ P_{(i-1)X}, & \text{otherwise} \end{cases};$$

and $$N_{iX} = \begin{cases} N_{(i-1)X} + 1, & \text{if } (F_{i,X} < 0) \\ N_{(i-1)X}, & \text{otherwise} \end{cases};$$

said identified pixels being identified by $P_{nX} \geq T_1$, $N_{nX} \geq T_1$, $P_{nY} \geq T_1$ and $N_{nY} \geq T_1$.

16. An apparatus for identifying objects with salient motion in a scene, said apparatus comprising:

means for identifying a region of change within a plurality of sequential frames, I(x, y, t), wherein identifying said region of change develops a temporal filter;

means for determining optical flow for said region of change over a given period of time, [t, t+n];

means for identifying seed pixels in said region moving in a common direction;

means for expanding identified said seed pixels, pixel clusters being formed from expanded said seed pixels; and means for fusing temporal imaging results.

17. A apparatus as in claim 16, wherein the means for identifying said region of change for each image comprises:

means for finding a difference image $I_{difference}(x, y, t)$ using a weighted accumulation, $I_{accum}(x, y, t)$, with a fixed weight for each new observation.

* * * * *